Figure 1:
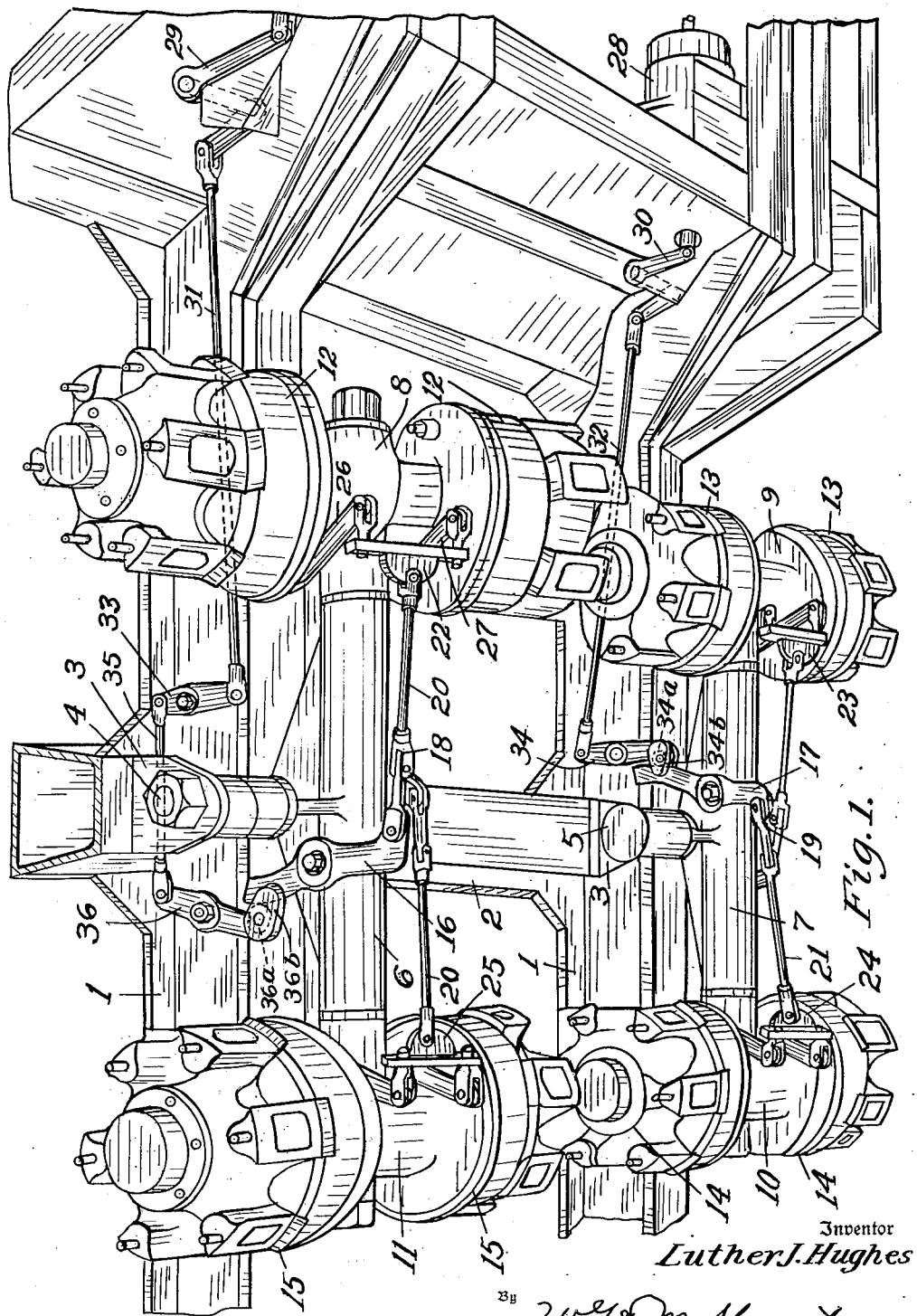

Patented Nov. 27, 1951

2,576,460

UNITED STATES PATENT OFFICE 2,576,460

TRAILER BRAKE AND EQUALIZATION SYSTEM

Luther J. Hughes, Reading, Pa.

Application August 12, 1949, Serial No. 109,946

9 Claims. (Cl. 188—2)

This invention relates to brake mechanism for vehicles, more particularly to a brake operating and equalizing system for heavy duty trailers having sets of rear wheels arranged in tandem in a manner so as to rock about a transverse axis, the wheels of each set being rotatable about a longitudinal axis thereby permitting the wheels to move up and down in longitudinal and transverse planes to compensate for road irregularities.

A common type of brake operating and equalizing mechanism for the above described trailer involves the use of flexible cables to compensate for changes in the position of the wheels relative to each other. After short use, however, cables stretch so that the original throw of the brake applying mechanism is insufficient to fully apply the brakes. Also since such cables are enclosed in sheaves there is a great tendency for them to stick or freeze from accumulation of dirt, snow, ice, etc., rendering the brake mechanism unreliable. While brake systems devoid of cables have also been used, these, in general, have been relatively complicated in construction and have not permitted maximum safety in operation of the brakes, such as in the case where one of the brake linkages breaks or binds in a given position, necessitating equal distribution of the load among the others.

An object of the present invention is to provide a novel brake operating and equalizing mechanism, which is devoid of the above named disadvantages of commonly used brake systems.

A more specific object of the present invention is to provide a relatively simple but extremely reliable brake applying and equalizing system for trailers having universal rocking wheels rotatable about two axes disposed at right angles to each other to permit up and down movements of the wheels in different vertical planes so as to conform to irregularities in the contour of a roadway surface.

A further object of the invention is to provide a brake system for heavy duty trailers with multiple sets of wheels arranged in tandem which system permits independent operation of the respective brakes while permitting effective equalization thereof.

A still further object of the invention is to provide an air operated brake and equalizing system for trailers and the like which does not require hydraulic means for its operation, therefore is free from failure such as caused by leakage of hydraulic fluid.

A still more specific object of the invention is to provide, on a trailer having fore and aft sets of rear wheels adapted to rock about a transverse axis and each set adapted to rotate about a longitudinal axis, a brake operating and equalizing mechanism wherein regardless of the relative positions into which the wheels have rocked at a particular instant there will be no affect on the brake applying means and wherein positive coupling elements are continuously provided to assure operation and equalization of the brakes at all times, even in emergencies such as when one of the brakes should stick or otherwise become inoperative, in which case the remaining brakes will equally share the braking load.

Figure 2:
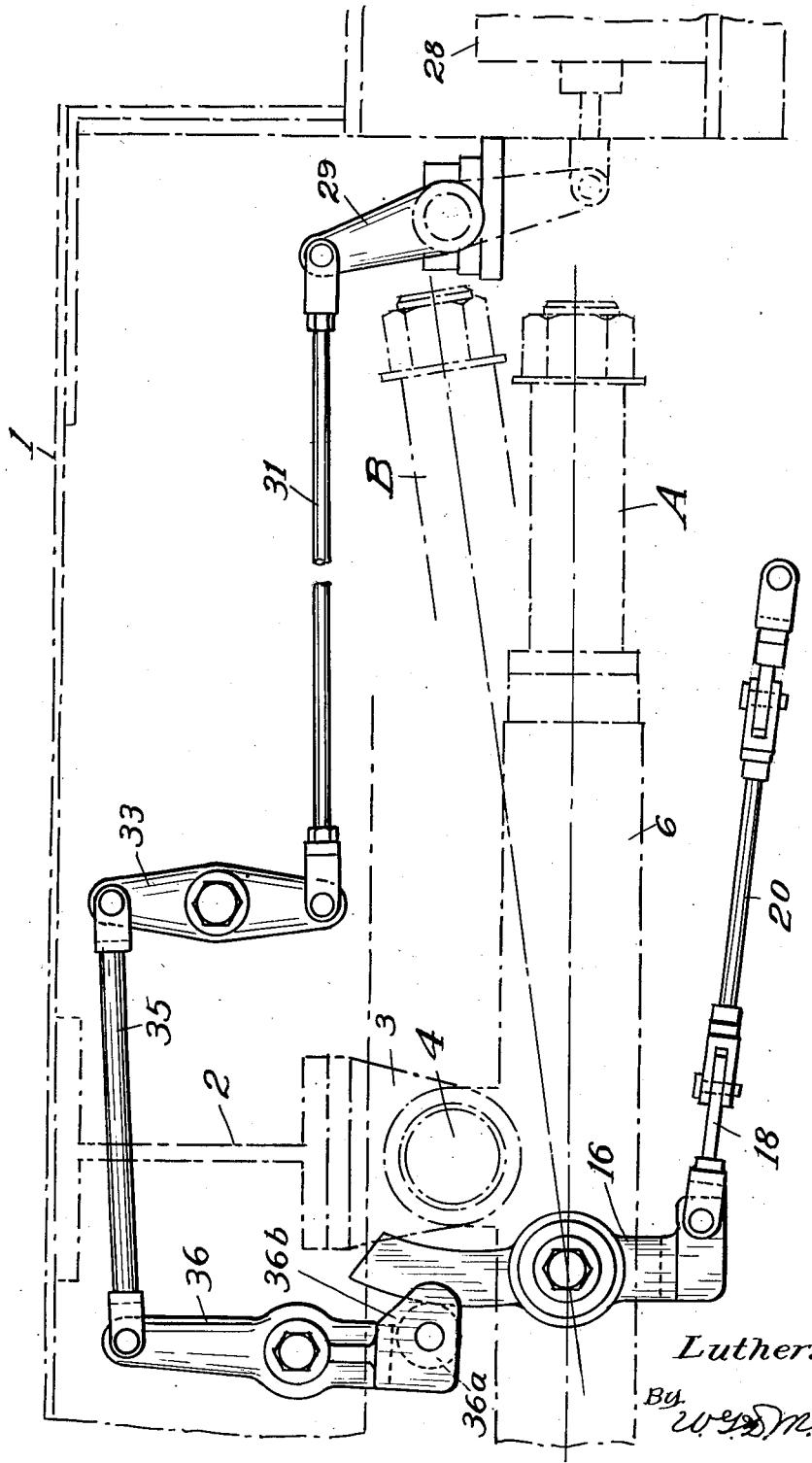

Other objects and advantages will become more apparent after a study of the following specification taken with the accompanying drawings wherein:

Fig. 1 is a perspective view taken underneath the rear portion of a heavy duty trailer showing a brake applying and equalizing mechanism embodying the principles of the present invention, and Fig. 2 is a side elevational view showing coupling means involving a rolling contact type of connection and forming an important feature of the invention.

Referring more particularly to Fig. 1 of the drawings the trailer shown for purposes of illustration has eight dual-tire wheels for supporting the rear end of the trailer. In order to better illustrate the invention the tires have been omitted and only the hubs for mounting the respective dual-tire wheels are shown. The trailer illustrated is of the low bed type, adaptable for carrying very heavy loads and having a frame with longitudinal sills 1 and a cross frame member 2 at the rear portion thereof. Bracket bearings 3 are secured to the underside of the cross frame member 2 and have bearing sleeve portions serving as bearings for transverse shafts 4 and 5 which are integrally formed on walking beams 6 and 7 respectively to permit rocking of the walking beams in longitudinally extending vertical planes. On the end portions of each walking beam there is rockably mounted thereabout housings 8, 9, 10 and 11 which have integrally secured thereto wheel hub pairs 12—12, 13—13, 14—14, 15—15, respectively. Each hub is adapted to support a dual tire, however such tires have been omitted from the drawing to show the invention more clearly. Thus, by virtue of the rocking movements of walking beams 6 and 7 invertical, longitudinal planes the wheels will rock about a transverse axis, moving upwardly and downwardly relative to the frame as required by irregularities in the road surface. Concurrently, the wheel hubs will rock independently about the longitudinally extending axis at the ends of each of the walking beams so as to provide universal movement of the wheels.

Pivotally mounted on each side of the respective walking beams 6 and 7 are brake operating levers, such as 16 and 17. The lower ends of the levers have secured thereto swivel connections, such as 18 and 19 which, in turn, are connected to links 20 and 21, respectively. The opposite ends of these links are connected to floating brake equalizing bars 22, 23, 24 and 25 which, in turn actuate brake levers, such as 26 and 27 which rotate cam shafts so as to expand brake shoes (not shown) of any well known construction.

The power operating means for applying the brakes includes compressed air cylinders, such as 28, which actuate bell crank levers such as 29 and 30, which, in turn, exert a pull on links, such as 31 and 32 respectively. These links rotate levers such as 33 and 34 pivoted on the framesills 1. Lever 33 through a link 35 is connected to one end of lever 36 pivoted on the frame-sill 1, whereas lever 34 is directly coupled to lever 17 by a rolling connection to be described hereinafter. On the other end of levers 34 and 36 are rotatably mounted rollers 34a and 36a respectively, which are sandwiched between guide lugs or ears 34b and 36b integrally formed on opposite sides of the lower ends of levers 34 and 36.

An important feature of the present invention is the manner power levers 34 and 36 are coupled to brake operating levers 17 and 16, respectively. Such coupling or connection, as best illustrated in Fig. 2, is in the form of a rolling connection which is nevertheless positive and strong mechanically. The roller 36a on the lower portion of lever 36 is adapted to roll on the arcuate shaped edge surface of the upper part of lever 16. Ears 36b restrain roller 36a from sidewise movement to insure that it will always ride on the arcuate edge of lever 16. Also it will prevent buckling of the roller connection and will provide a strong and rigid coupling.

The arcuate shape of lever 16 is a segment of a circle whose center coincides with the axis of the walking beam, that is the axis of transverse shaft 4. The purpose of such arrangement is so that that despite rocking movements of the walking beam about a transverse axis, such as movement from position A to position B represented by dash and dot lines, the position of lever 36 is unaffected, that is, rocking movements of the walking beam 6 and oscillating movements of lever 16 will not transmit motion to lever 36. As the roller 36a rolls on the arcuate edge of lever 16 guided by ears 36b thereof which extend closely adjacent opposite sides of the arcuate portion, the only change in the brake linkage will be that the distance between the power applying point of lever 36 and the center of lever 16 will be lengthened or shortened. However, the moment arm remains substantially the same because as the center of the brake operating lever 16 moves through an arc with the transverse shaft 4 as a center, the direction of the component of force at right angles to a line drawn between the center of lever 16 and transverse shaft 4 will also change somewhat in a manner that so as to render negligible any change in the moment arm, that is the product of such force component and the moment arm length.

To make the rolling connection between roller 36a and the arcuate portion of the brake operating lever even more devoid of friction, a grease fitting (not shown) of any well known construction may be applied closely adjacent thereto to assure frictionless rolling contact at all times and to minimize wear. The roller and contacting edge of the arcuate portion of lever 16 may be case hardened to further minimize wear and assure a positive connection of unvarying force transmitting characteristics.

In operation, when it is desired to apply the brakes, brake applying pressure is exerted by the pistons of the compressed air cylinders 28 which cause rocking of bell crank levers 29 and 30 and pulling of links 31 and 32. As link 31 is pulled, levers 33 and 36 are rocked counterclockwise and lever 16 clockwise by virtue of the rolling connection through roller 36a to cause pulling or link 20 and of the floating brake equalizing bar 22 to cause equalized application of the brakes associated with the wheel hubs 12, 12. However, the brake operating lever 17 as well as that on the inside of walking beam 6 will move in an opposite direction. For example, as operating force is applied by the piston of compressed air cylinder, bell crank lever 30 will move counterclockwise pulling link 32, turning lever 34 clockwise and brake operating lever 17 counterclockwise so as to pull link 21 and apply the brakes associated with wheel hubs 14, 14.

It should be especially noted that there is an independent braking system associated with each pair of wheel hubs or equalized pair of brakes. One of the braking linkage systems is mounted on the inside of each walking beam, and the other braking system is mounted on the outside. Thus the braking system on the opposite sides of walking beam 6 which is hidden from view by the walking beam 6 is similar in construction to the braking system shown on the inside of the other walking beam 7 which is in view in Fig. 1. Thus there are four independently operated braking systems in all, one for each pair of dual wheels.

In order to release the brakes, the motion of the various braking systems is, of course, in the opposite direction.

In the course of application or release of the brakes, as the walking beams rock on their respective transverse axes to give up and down movements of the wheels to correspond to road irregularities, no reactive motion is reflected to the brake operating system by virtue of the fact that the arcuate portions of levers 16 and 17 move about the transverse rocking axes of transverse shafts 4 and 5 as centers. Irregularities such as crowns in the road are compensated for by rocking movements of the respective wheel pairs about the longitudinal axes of the walking beams 6 and 7. This motion likewise is not reflected back to the brake operating system by virtue of the swivel movements of swivel linkages such as 18 and 19. The joints need not be pure swivel connections inasmuch as sufficient swivelling action may be obtained by virtue of the looseness of the connection of the clevis joints. Thus universal rocking movements of the wheels are obtained while assuring constant and equalized application of braking force.

In view of the independence of the four braking systems, if one should fail, for example by virtue of breakage of the swivel link connection with the brake mechanism, the remaining braking systems will be unaffected and the entire load will be distributed equally among them. The brake applying lever of the faulty brake, in other words, will in no way influence the operation of the remaining brakes but will rock freely about its pivot.

Thus it will be seen that I have provided an efficient, relatively simple and highly reliable brake applying and equalizing system, particularly useful for trailers which are to carry heavy loads, whereby relatively constant application of braking pressure will be applied in an equalized manner to all of the brakes irrespective of rocking movements of the tandem arranged wheels about both longitudinal and transverse axis to conform to irregularities of the roadway surface, and wherein despite failure of one of the braking systems the remaining systems will bear the entire load in an equalized manner thus assuring positive operation of the brakes at all times and preventing unequal frictional resistance of the various brakes which would otherwise cause skidding of the trailer and shifting of the load.

While I have illustrated and described a certain specific embodiment of my invention, it will be understood that this is by way of illustration only, and that various changes and modifications may be made within the contemplation of my invention and within the scope of the following claims.

I claim:

1. In a heavy duty vehicle frame having wheel supporting means therefor including a longitudinally extending beam pivotally mounted centrally on a transverse axis and pairs of wheel hubs rockably mounted in the end portions of said beam, brake operating and equalizing means including a brake operating lever pivotally mounted on said beam in offset relationship to said axis, and having an arcuate edge portion with said transverse axis as a center, a brake linkage for operating said lever, including a power lever pivotally mounted on said frame and having solely a slidable connection with said brake operating lever arcuate edge portion, said edge portion being shaped so that rocking movements thereof about said transverse axis will impart no motion to said power lever through said slidable connection.

2. In a heavy duty vehicle frame having wheel supporting means therefor including a longitudinally extending beam pivotally mounted centrally on a transverse axis and pairs of wheel hubs rockably mounted on the end portions of said beam, brake operating and equalizing means including a brake operating lever pivotally mounted on said beam in offset relationship to said axis, a brake linkage for operating said lever, including a power lever pivotally mounted on said frame and having solely a rolling connection with an edge portion of said brake operating lever, said edge portion being arcuate in shape with said transverse axis as a center so that rocking movements thereof caused by rocking of said beam about said transverse axis will transmit no motion to said power lever.

3. Apparatus recited in claim 2 but further characterized by said rolling connection comprising a roller rotatably mounted on the end of said power lever to provide an anti-friction rolling connection with the arcuate edge portion of said brake operating lever, and guiding means extending from the face portions of said roller and closely adjacent opposite faces of said arcuate portion for preventing lateral relative displacement of said power and brake operating levers during rolling movements thereof.

4. Apparatus recited in claim 2 together with an equalized brake operating system for at least one of said pairs of wheel hubs and a swivel connection between said equalized brake operating system and said operating lever.

5. Brake operating and equalizing mechanism for a heavy duty trailer having a frame, wheel supporting means therefor including a longitudinally extending beam pivotally mounted on said frame to oscillate about a transverse axis of said frame, and a wheel hub supporting housing rockably mounted on each end portion of said beam about the longitudinal axis of the beam, a pair of spaced wheel hubs integrally formed on each housing on opposite sides of the longitudinal axis of said beam, each of said wheel hubs having a brake lever associated therewith, said brake operating and equalizing mechanism comprising a pair of brake operating levers pivotally mounted on opposite sides of said beams in offset relationship to said transverse axis, brake applying means including a pair of power levers mounted on said frame, edge portions of said brake operating levers being arcuate in shape described about said transverse axis as a center and adapted to slide along end portions of said power levers so that rocking movements of said beam about said transverse axis will not transmit, through said sliding connection, motion to said power levers, and brake equalizing linkages connected between said brake operating levers and said brake levers associated with the respective pairs of wheel hubs, and including a swivel connection so that rocking movements of said pairs of wheel hubs about the end portions of said beam about the longitudinal axis will transmit practically no motion to said brake operating levers.

6. In a heavy duty trailer having a frame including longitudinally extending sills, a cross frame member and wheel supporting means including a pair of longitudinally extending beams rockably mounted at their centers on transverse axes below said cross frame member, a housing rockably mounted on each end portion of said beams about their longitudinal axes, said housings having integrally secured thereto pairs of wheel hubs disposed on opposite sides of the longitudinal axis of the associated beam, each pair of wheel hubs having a brake lever associated therewith, in combination with said wheel supporting means, brake operating and equalizing mechanism comprising a pair of brake operating levers mounted on opposite sides of said respective beams, one end portion of said brake operating levers having an arcuate shaped edge with said transverse axis as a center, four independent power actuating means each including a power lever pivotally mounted on said frame and having a sliding connection with the arcuate edge of one of said brake operating levers so that rocking of the last said brake operating lever about said transverse axis will impart no motion to said power lever through said sliding connection, brake equalizing means including a swivel connection connected between the other ends of the respective brake operating levers and their associate brake levers so that the respective housings may freely rock about the end portions of said beams without imparting appreciable movement to the brake operating levers.

7. In a heavy duty vehicle frame having wheel supporting means therefor including a longitudinally extending beam pivotally mounted on a transverse axis and wheel-hubs rockably mounted on the end portions of said beam, brake operating and equalizing means including a brake operating lever pivotally mounted on said beam in offset relationship to said axis, a brake linkage for operating said brake operating lever, said brake linkage including a power lever, and a rolling connection between said brake operating lever and said power lever, said rolling connection comprising an arcuate member for a first of said levers and an engaging member on the other of said levers, said arcuate member being substantially co-axial with said transverse axis, and said engaging member frictionally engaging said arcuate member by a rolling action about said transverse axis as a center.

8. A heavy duty vehicle comprising, in combination, a frame, a longitudinally extending beam pivotally mounted on said frame for movement about an axis transverse to said frame, wheel-hubs rockably mounted on the forward and rearward end portions of said beam, brake means for said wheel-hubs, brake operating and equalizing means connected to said brake means, comprising a pair of brake operating levers, each of said levers being pivotally mounted on a side of said beam in offset relation to said axis, said levers being on opposite sides of said beam, brake linkage means for operating said brake operating levers, said linkage means comprising a pair of power levers, each of said power levers being operatively associated with a separate one of said brake operating levers, each of said power levers being pivotally mounted on said frame, and an abutting connection between each of said power levers and the associated brake operating lever, each connection comprising an arcuate member for one of said levers and a roller for the associated lever for providing solely a rolling connection therebetween, each arcuate member being substantially a circular portion co-axial with said transverse axis.

9. Apparatus as defined in claim 8 in which said arcuate members face in opposite directions.

LUTHER J. HUGHES.

REFERENCES CITED

The following references are of record in the file of this patent:

UNITED STATES PATENTS

| Number | Name | Date |
|---|---|---|
| 1,673,846 | Reid | June 19, 1928 |
| 1,928,083 | Warren | Sept. 26, 1933 |
| 2,152,442 | Rogers | Mar. 28, 1939 |
| 2,152,443 | Rogers | Mar. 28, 1939 |
| 2,490,641 | Rostu | Dec. 6, 1949 |